United States Patent [19]

Brannon et al.

[11] Patent Number: 5,103,905
[45] Date of Patent: Apr. 14, 1992

[54] METHOD OF OPTIMIZING THE CONDUCTIVITY OF A PROPPED FRACTURED FORMATION

[75] Inventors: Harold D. Brannon, Glenpool; Janet Gulbis; Milton T. King, both of Tulsa, all of Okla.; George W. Hawkins, Midland, Mich.

[73] Assignee: Dowell Schlumberger Incorporated, Tulsa, Okla.

[21] Appl. No.: 518,771

[22] Filed: May 3, 1990

[51] Int. Cl.$^5$ .................... E21B 43/267; E21B 47/00
[52] U.S. Cl. .................................. 166/250; 166/280; 166/300; 166/308; 252/8.551
[58] Field of Search ............... 166/271, 280, 300, 308, 166/250; 252/8.551

[56] References Cited

U.S. PATENT DOCUMENTS

| | | | |
|---|---|---|---|
| 4,202,795 | 5/1980 | Burnham et al. | 252/8.554 X |
| 4,506,734 | 3/1985 | Nolte | 166/308 |
| 4,560,486 | 12/1985 | Hinkel | 252/8.551 |
| 4,610,795 | 9/1986 | Norris et al. | 252/8.551 |
| 4,647,385 | 3/1987 | Williams et al. | 252/8.551 |
| 4,741,401 | 5/1988 | Walles et al. | 166/300 |
| 4,770,796 | 9/1988 | Jacobs | 252/8.553 |
| 4,795,574 | 1/1989 | Syriner et al. | 252/8.551 |
| 4,828,028 | 5/1989 | Soliman | 166/250 |
| 4,848,467 | 7/1989 | Cantu et al. | 166/300 X |
| 4,919,209 | 4/1990 | King | 166/300 |
| 4,969,526 | 11/1990 | Cawiezel | 166/300 |

OTHER PUBLICATIONS

Breaker Concentrations Required to Improve the Permeability of Proppant Packs Damaged by Concentrated Linear and Borate-Crosslinked Fracturing Fluids, SPE 20135, pp. 409-418, H. D. Brannon et al., Mar. 1990.
An Evaluation of the Effects of Environmental Condition and Fracturing Fluids Upon the Long-Term Conductivity of Proppants, SPE 16900, pp. 229-244, G. S. Penny, Sep. 1987.
Laboratory Study of Proppant-Pack Permeability Reduction Caused by Fracturing Fluids COncentrated During Closure, SPE 18261, pp. 787-800, G. W. Hawkins, Oct. 1988.
Evaluation of the Breaker Concentrations Required to Improve the Permeability of Proppant Packs Damaged by Hydraulic-Fracturing Fluids, SPE 19402, pp. 29-38, Brannon et al., Feb. 1990.
Encapsulated Breaker for Aqueous Polymeric Fluids, SPE 19433, pp. 245-253, J. Gulbis et al., Feb. 1990.
Application of Fracture Design Based on Pressure Analysis, SPE 13393, pp. 31-42, K. G. Nolte, Feb. 1988.

*Primary Examiner*—George A. Suchfield
*Attorney, Agent, or Firm*—Stephen A. Littlefield

[57] ABSTRACT

Method of reducing the viscosity of a fracturing fluid containing a polymer by introducing both delayed breaker and nondelayed breaker into the fracturing fluid. Preferably, the relative amounts of delayed and undelayed breaker are determined by first determining the concentration of polymer in the fracture, determining the relationship of breaker concentration for a polymer concentration to proppant pack permeability, picking a desired proppant pack permeability, calculating the amount of breaker necessary to lessen the viscosity of the polymer concentration in the fracture to the desired permeability. This amount of breaker is X. Next, the minimum viscosity of the fracturing fluid which maintains the proppant in suspension in the fracture is determined. The amount of breaker Y which lessens the viscosity of the fracturing fluid no lower than this minimum viscosity is calculated for the bottom hole static temperature and an interval of time. The amount of delayed breaker Z which upon initial introduction into the fracturing fluid releases Y is calculated. Finally, if X is less than Y, no more than X amount of delayed breaker is introduced into the fracturing fluid; however if Y is less than X, no more than Z amount of delayed breaker is introduced into the fracturing fluid. Additionally, Y amount of nondelayed breaker may be introduced into the fracturing fluid at each of its treatment stages.

11 Claims, 4 Drawing Sheets

METHOD OF OPTIMIZING THE CONDUCTIVITY OF A PROPPED FRACTURED FORMATION

FIELD OF THE INVENTION

The invention relates to a method of improving permeability of proppant packs in subterranean formation fractures and, more particularly, of improving proppant pack permeability by using a combination of delayed and non-delayed breakers.

TECHNOLOGY REVIEW

Fracturing fluids contain polymers, typically guar and its derivatives. These high molecular weight polymers increase the viscosity of the fracturing fluid and make it possible to transport propping agent into a fracture. Crosslinking agents may also be used to provide even higher viscosities and better proppant transport capabilities. During the fracturing treatment, high pressure causes fluid to be lost to the rock formation. Generally, the rock has a low enough permeability that essentially all of the polymer remains in the fracture while the aqueous portion leaks off. This means that the polymer becomes highly concentrated within the proppant pack, that is, the pack of proppant in the fracture after closure, resulting in loss of fracture conductivity. The greater the thickness of the filtercake, the more of the available pore volume it occupies and consequently, the greater the observed damage to the proppant pack permeability.

Methods have been developed to degrade the polymer's molecular weight, which facilitates its removal through dilution and displacement by the reservoir fluids. Degradants, also known as breakers, such as oxidizers, have been used for the purpose. Unfortunately, many such oxidizers begin to attack and degrade the fluid immediately upon contact. Therefore, they must be used sparingly to allow execution of a treatment. Accordingly, use of too much oxidizer may result in destroying the fluid's ability to transport proppant, resulting in premature treatment termination. This phenomenon has led to breaker schedules of certain temperature dependent exposure times. The schedules must compromise between the fluid viscosity required to place proppant where needed and the degradant concentration required to break the fluid to a non-damaging state for return. In practice, the first priority is to successfully treat a formation and accordingly breaker addition schedules are designed to err on the conservative side (i.e. too little breaker added). As a result, fracturing fluids are rarely properly broken, leading to a high incidence of severe proppant pack damage.

Common fracturing fluid breakers are added at low levels (0.1–1 lb/1000 gal) to reduce the viscosity of the starting fluid (20–70 lb/1000 gal polymer). Because the polymer is concentrated 4–25 times, the low levels of breaker ordinarily used are not sufficient to clean the proppant pack. If higher breaker concentrations are used, fluid viscosity is reduced too rapidly and the proppant transport properties are compromised. A way to add larger quantities of breaker is to encapsulate the breaker so that the fracturing fluid is protected from the breaker while it is transporting proppant.

The delayed breaker technology ideally allows degradants to be added throughout the treatment, and to be placed down the entire length of the fracture. Once the treatment has been completed, the breaking process is activated by release of degradants. The degradant release and activation may be dependent upon mechanical stress imparted at closure, heating to reservoir temperature (melting or solubility of the coating), diffusion, or reaction between a fluid present in the reservoir (treating fluid or reservoir fluid) and the coating or the encapsulated degradant.

Breaker schedules are currently based on the quantity necessary to reduce the viscosity of the original fracturing fluid to some low level, such as 10–20 cps, in a certain period of time. Breaker scheduling must be based on the final polymer concentration in the fracture and not on the polymer concentration in the original fracturing fluid. A typical fracturing fluid may contain polymer at a concentration of 40 lb/Mgal. Due to fluid loss during the treatment and during closure of the fracture, the final concentration of polymer in the proppant pack may be 160 to over 1000 lb/Mgal. Much higher breaker concentrations are required to degrade the more concentrated polymer solution. The economics of using encapsulated breaker vary with the well and the type of fracturing treatment used. Using the fracture net present value to design the optimum fracture treatment may indicate tremendous economic benefit in reducing the pack damage from 90% to 50%, for example. It may show little benefit in further reducing the damage from 50 to 10%. This type of analysis should be done to ensure that the maximum benefit is gained from the use of encapsulated breaker but that money is not wasted on unnecessarily high levels. It must be understood that there may be limits to the amount of encapsulated breaker which can be used. Encapsulated breakers often are not perfectly coated and some leakage will occur. This prematurely introduces dissolved breaker into the fracturing fluid. Viscosity reduction caused by the dissolved breaker will limit the quantity of encapsulated breaker which can be used.

A method for delayed chemical release in an aqueous fluid was disclosed in U.S. Pat. No. 4,202,795 to Burnham et al. A first compound, e.g. a breaker, was mixed with a hydratable gelling agent (a polymer) and a second compound which "breaks" the hydratable polymer. Upon exposure to the aqueous fluid, e.g. a fracturing fluid, the hydratable polymer expands and encapsulates the first compound. As time passes, the second compound dissolves the hydrated polymer, releasing the first compound, the breaker, into the aqueous fracturing fluid.

U.S. Pat. No. 4,506,734 to Nolte describes a breaker activated by the fracture closure for aqueous- or oil-based fluid. The degradant is encapsulated in hollow, crushable beads. The encapsulation would delay contact of the breaker with the fluid until crushing was effected upon closure, releasing the degradant to the fluid.

U.S. Pat. No. 4,741,401 to Walles et al. discloses controlled release capsules comprising a breaker contained within an enclosure member for aqueous fracturing fluids. The enclosure member is permeable to at least one fluid in the formation or injected with the capsules such that, upon sufficient exposure to the fluid, the capsules rupture, thereby releasing the breaker to the formation and the proppant pack matrix. Therefore, any encapsulated breaker particles not crushed upon closure will be released by the secondary method.

U.S. Pat. No. 4,770,796 to Jacobs describes a wax encapsulated, anionic breaker for crosslinked, acid fracturing gels. At the acidic, elevated temperature conditions in the formation, acid and water migrate through the encapsulant and release the anion from its salt. The anion concentration increases until osmotic pressure causes the gradual diffusion of the anion through the encapsulant. A wax enclosed breaker particle may additionally be meltable by the reservoir temperature or soluble in a reservoir fluid, either of which would accomplish delayed release of a degradant.

U.S. Pat. No. 4,919,209 to King discloses a controlled release capsules made of a breaker encompassed in an encapsulant for use in gelled oil fraction fluids. Here the enclosure member has a composition which dissolves or erodes off upon sufficient exposure to at least one fluid in the formation or injected with the capsules. Upon sufficient exposure, the breaker is released.

Another method of improving the retained proppant pack permeability has been proposed by Penny, Ely, and others. The premise of this method is to reduce the polymer concentration within the proppant pack by allowing the treating fluid to flow back to the surface as the fracture volume is reduced upon closure. The final polymer concentration within the proppant would be reduced by that amount allowed to flow back. The fracture width at shutin vs. retained permeability data reported by the STIM-LAB, Inc. Consortium in the 1988 Final Report illustrates that this theory is indeed valid.

However, if fracturing fluid degradation were solely dependent upon the action of a delayed breaker, it would not be possible to flow back during closure, because flowing back nondegraded fluid could result in flowing proppant out of the wellbore. Thus, some minimum time is required after the termination of the pumping for the delayed breakers to act on the polymer. Accordingly, when a delayed breaker is used alone throughout an entire treatment, the fracture must be allowed to close, i.e. some minimum time must be allowed for breaker release, before flowback can be initiated. Such action results in damaging polymer concentration within the proppant pack due to leakoff of the non-polymeric fluids of the fracturing fluid during closure.

SUMMARY OF THE INVENTION

An object of this invention is to allow much higher concentrations of the breaker to be added to the fluid, without prematurely destroying the viscosity of the fluid. Delayed breaker ca also be added to the fluid much earlier in the treatment, allowing it to be placed deeper into the fracture. Additionally, the breaker is contained within the fracture with the polymer, as opposed to being lost to the formation through leakoff.

The present invention is an improved method of fracturing, using a combination of delayed and non-delayed breakers to improve the retained proppant pack permeability and ultimately, a well's production. This improved technique will allow one to utilize the benefits of a delayed breaker in the early portion of a treatment in order to place the degradant in elevated concentrations down the length of a fracture without sacrificing fluid performance. In the latter portion of a treatment, when the reservoir has cooled to the extent that the addition of an active degradant will not compromise the treatments execution, non-delayed breaker is added to allow flowback upon fracture closure.

The present invention also includes a method for determining the optimum level of encapsulated breaker to use and the best way to schedule its addition into the fracturing fluid. The general procedure is as follows:

1. Determine the expected final polymer concentration in the proppant pack.
2. Determine the pack permeability desired.
3. Determine the quantity of breaker (X) necessary to achieve the permeability in 2.
4. Determine the quantity of dissolved breaker (Y) which can be present in the fracturing fluid without causing an unacceptably low viscosity.
5. If the delayed breaker releases some breaker during initial exposure to the fluid, determine the quantity of delayed breaker (Z) which releases a quantity Y.
6. Introduce into the fracturing fluid an amount of delayed breaker which is the smaller amount of X or Z.

The present invention provides for minimized proppant pack damage without compromising the fluid's proppant transport properties during the pumping treatment. Upon completion of the pumping treatment, the non-delayed breaker degrades the viscosity of the near-wellbore fluid so that it is incapable of transporting the proppant back up the tubing, thus reducing the polymer concentration within the fracture. Upon closure (or other release mechanism) the delayed breaker is released to further degrade the fluid to which it is exposed, ultimately resulting in a much less damaged proppant pack.

The use of a larger and/or higher density proppant for the final stage or stages of the pumping treatment is beneficial in accomplishing a rapid flowback without proppant movement.

DETAILED DESCRIPTION OF THE PREFERRED EMBODIMENTS

Figure 1:
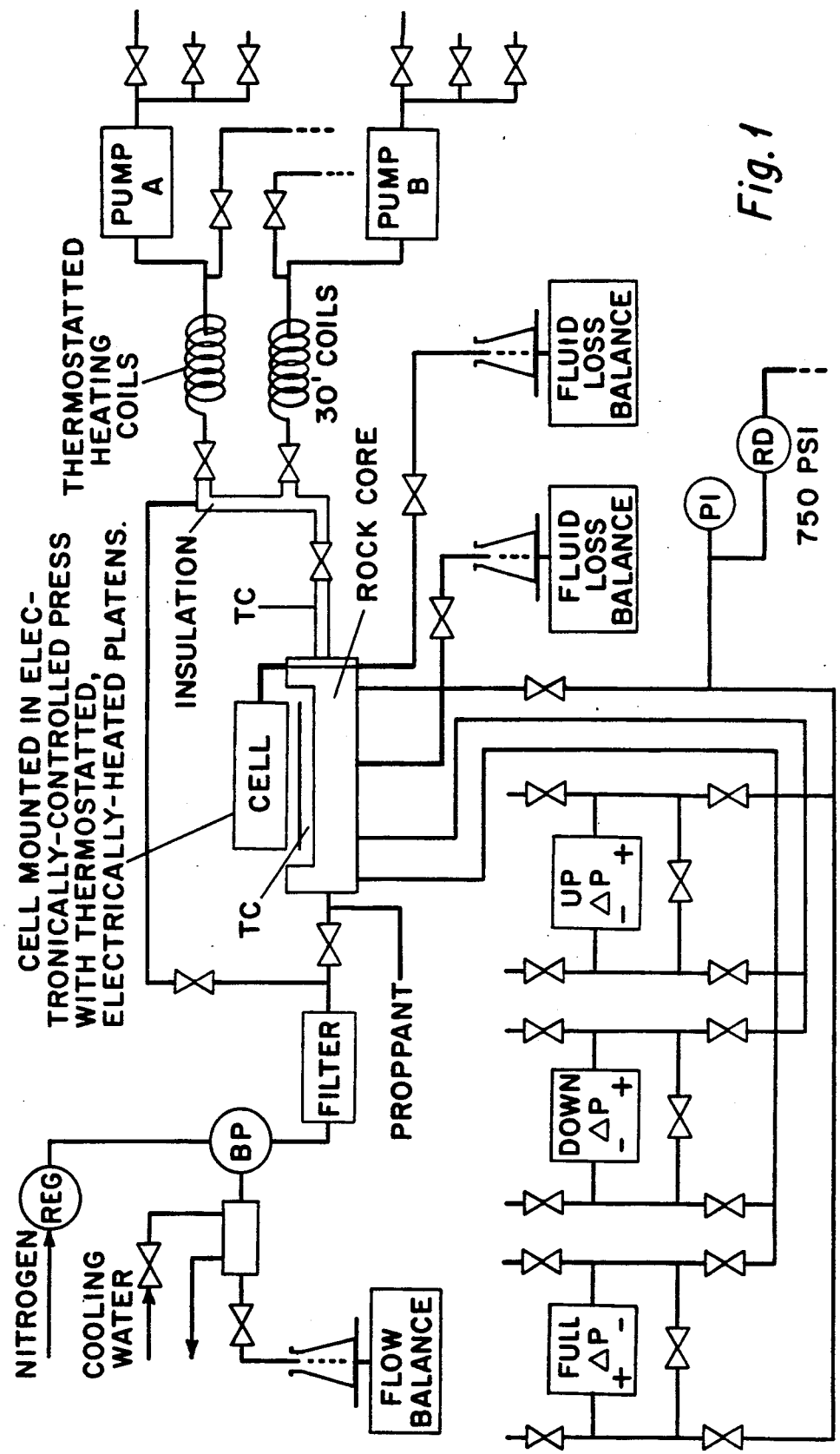
FIG. 1 is a schematic of test equipment for calculating the proppant pack permeability for various amounts of breaker and polymer.

As stated above, the method of the present invention requires a determination of the final polymer concentration in the proppant pack, which is in the fracture; picking a desire proppant pack permeability; determining the quantity of breaker (X) necessary to achieve the desired permeability; determining the quantity of breaker which can be present in the fracturing fluid without causing an unacceptably low viscosity of the fluid, that is fluid viscosity too low to keep proppant suspended in the fracturing fluid in the fracture. If the delayed breaker releases some breaker during initial exposure to the fluid, determining the quantity of delayed breaker (Z) which releases a quantity (Y); and introducing into the fracturing fluid an amount of encapsulated breaker which is the smaller amount of X or Z.

Estimated Polymer Concentration in the Proppant Pack

To find the final concentration of polymer in the proppant pack, first the volume of the fracture must be calculated. As those skilled in this technology are aware, it is known to use computer simulations to estimate the length and width of a fracture created in a given formation by a treatment design. Next, the maximum concentration of the polymer in the proppant pack is calculated. To do this, the total volume of polymer delivered to a fracture in the course of a treatment is calculated. As stated above, because the formation generally has a sufficiently low permeability, some of the non-polymeric portion of the fracturing fluid is typically lost to the formation, allowing all the polymer to concentrate in the fracture. With this assumption, the final polymeric concentration in the proppant pack can be calculated by subtracting the proppant volume from the fracture volume, giving the volume of the fracture available for occupation by the polymer. The ratio of the total number of pounds of polymer delivered in the treatment divided by the volume of the fracture available for occupation is divided by the original number of pounds per thousand gallons of polymer in the fracturing fluid to yield the concentration factor in a given treatment.

Choice of Desired Proppant Pack Permeability

A classic definition of clean proppant permeability is:

$$K_p = \frac{K * FCD * X_f}{W} \quad (1)$$

where
$K_p$ = proppant pack permeability
$K$ = formation permeability
$FCD$ = fracture conductivity ratio
$X_f$ = fracture length
$W$ = fracture width or $$FCD = \frac{W}{X_f} \cdot \frac{K_p}{K} \quad (2)$$

* = multiplication

The desired permeability of the proppant pack with polymer is typically chosen on a cost benefit analysis basis. For example, the value of the potential yield of a formation, typically estimated from computer models, is compared to the expense of the encapsulated breaker for the fracturing fluid. Of course, the formation character influences this comparison. As a practical matter, the damage to a proppant pack due to polymer concentration is typically greater than 85% $K_p$. Further, in this technology, FCD, the fracture conductivity ratio, which has a scalar relationship to $K_p$ divided by K, is preferably greater than 10. Therefore, a highly permeable formation, i.e. high K, requires a high pack permeability $K_p$. Obviously these practical considerations are coupled to the ultimate result of a cost benefit analysis governing how much encapsulated breaker would want to be used.

Calculation of Breaker Amount to Achieve Desired Proppant Pack Permeability

The third step of the present invention, of calculating the minimum breaker necessary to achieve the desired pack permeability, may be practiced with the following equipment. A highly modified American Petroleum Institute (API)-type fracture conductivity cell may be used in which proppant is confined between two precision machined cores. A schematic of the test cell and flow system are shown in FIG. 1. Fluid leakoff occurs through the cores during fracture closure, concentrating the fracturing fluid within the proppant pack of the simulated fracture. The cell is then shut-in for 17 hours at the test temperature and closure stress. After shut-in, a brine solution is flowed through the proppant pack and the pressure differentials are monitored until a steady state is achieved. Proppant pack permeabilities are calculated from the fracture measurements, flow rate, and pressure drop data.

The dual core test cell is constructed of Monel and uses the API recommended ten square inch flow path and port spacing. A rock core, fixed in place by a lower piston, serves as the proppant pack substratum. A sliding upper piston positions a rock core onto the upper surface of the proppant pack. Each piston is designed to allow for passage of the fluid leakoff through the cores.

A computer-controlled Dake hydraulic press with electronically-controlled heated platens are used to confine the cell and to heat it to the test temperature. The hydraulic press is used to supply both hydrostatic pressure to cause fluid loss and closure stress to the proppant.

Precise and continuous brine flow against a 250 psi backpressure is accomplished using duplex chromatography pumps. The brine flow rate is computer-monitored by the weight of effluent collected on an electronic balance. The brine is heated by flow through a twenty foot coil of ⅛ inch 316 stainless steel tubing which was wrapped in electronically-controlled heat tape. The brine temperature is monitored at the cell entrance.

Validyne P305D differential pressure transducers are used to measure the pressure drops across three distinct segments of the proppant pack. As shown in FIG. 1, differential pressure measurements were made across the upstream half, the downstream half, and the full length of the proppant pack. This arrangement serves as a check for leaks, plugged ports, level proppant placement, and transducer accuracy. The differential pressure transducers are calibrated daily to 0.0001 psi accuracy using a column of water.

A VAX Station 3200 computer is used to monitor and record cell and fluid temperatures, fluid loss and effluent balances, and cell hydrostatic, differential, and closure pressures. The hydraulic press is computer-controlled through all phases of a test. Also, permeabilities across the cell are calculated and reports are generated. All pertinent information is forwarded to a fluid loss and fracture conductivity data base.

Proppant is placed in the cell and leveled with a blade-type leveling device. 2% wt KCl cleanup fluid is used to saturate the proppant pack and to fill all cell ports. The fracturing fluid, when used, is carefully added to the cell without disturbing the proppant pack. The upper core and piston are then put in place and all air is bled from the cell as the piston is lowered.

Temperature history is a critical factor when evaluating the effects of breakers on fracturing fluids. Heatup rates are selected to achieve 75% of the desired temperature increase within thirty minutes. The cell is placed between the preheated press platens and heated to 140° F. in thirty minutes. A closure pressure of 500 psi is then applied to the simulated fracture to initiate fluid loss through the cores. The filtrate passing through the cores is directed to computer-monitored collection vessels. Fluid loss continues until the fracture was completely closed. The closure stress is then computer ramped to the 3000 psi, at rate of 100 psi/min. The cell is shutin for 17±1 hours at 160° F. and 3000 psi closure stress.

The 17 hour shutin is followed by the flowback, or cleanup phase of the test. The flowback phase is immediately preceded by transducer calibration, pack width measurements, flushing flow lines with heated cleanup fluid, and application of 250 psi backpressure to the flow system. Cleanup begins by flowing a 2 wt% KCl brine cleanup fluid through the proppant pack at 3.00±0.10 cm³/min (equivalent to 8 bbl/ft c² ross-sectional area at the wellbore per day). The upstream and downstream measurements usually differ initially, but converge as the test proceeds. This behavior is attributed to solublization and dilution of the concentrated fluid with the proppant pack by the flowing brine and migration of mobile residue across the measurement area. Flow is continued until steady state differential pressure readings are obtained and a minimum of 40 pore volumes of cleanup fluid are pumped through the proppant pack. The steady state condition is defined as when the upstream and downstream reading are near convergence and do not change for at least 10 pore volumes. The flow rate is then incrementally increased three times for at least ten minutes at each rate. A plot of the ramp data shows if the test has been run under laminar or turbulent flow conditions and also serve as a check for the differential pressure zero shift. After the flow rate ramp, the flow rate is returned to 3.00 cm³/min. If these differential pressure readings are in agreement with the previous readings at this flow rate, the test is concluded.

Permeabilities are calculated using Darcy's Equation for laminar flow.

$$k = \frac{Q \mu L}{A (\Delta P)} \quad (3)$$

where,
- k = permeability, darcy
- Q = flowrate, cm³/sec
- μ = viscosity of flowing fluid, cp
- L = length across which ΔP is measured, cm
- A = cross-sectional area of flow path, cm²
- ΔP = pressure drop across length L, atm.

The reported permeabilities are for the zero-corrected fullstream differential pressure measurements. Reproducibility is difficult when differential pressure measurements are very low as is typical when using a 10² in flow path. The differential pressure observed in these tests were in the range of 0.002 to 0.06 psi. Reproducibility for the presented data are ±6, 5, 4, and 3% respectively, for permeability measurements of >150, 150–100, 100–50, and <50 darcy.

With the above-described equipment, tests were conducted to determine the effects of polymer on the retained proppant pack permeability at 160° F., a typical bottom hole static temperature (BHST). Crosslinked and non-crosslinked guar was used as the polymer, with ammonium persulfate (APS) as the breaker.

Figure 3:
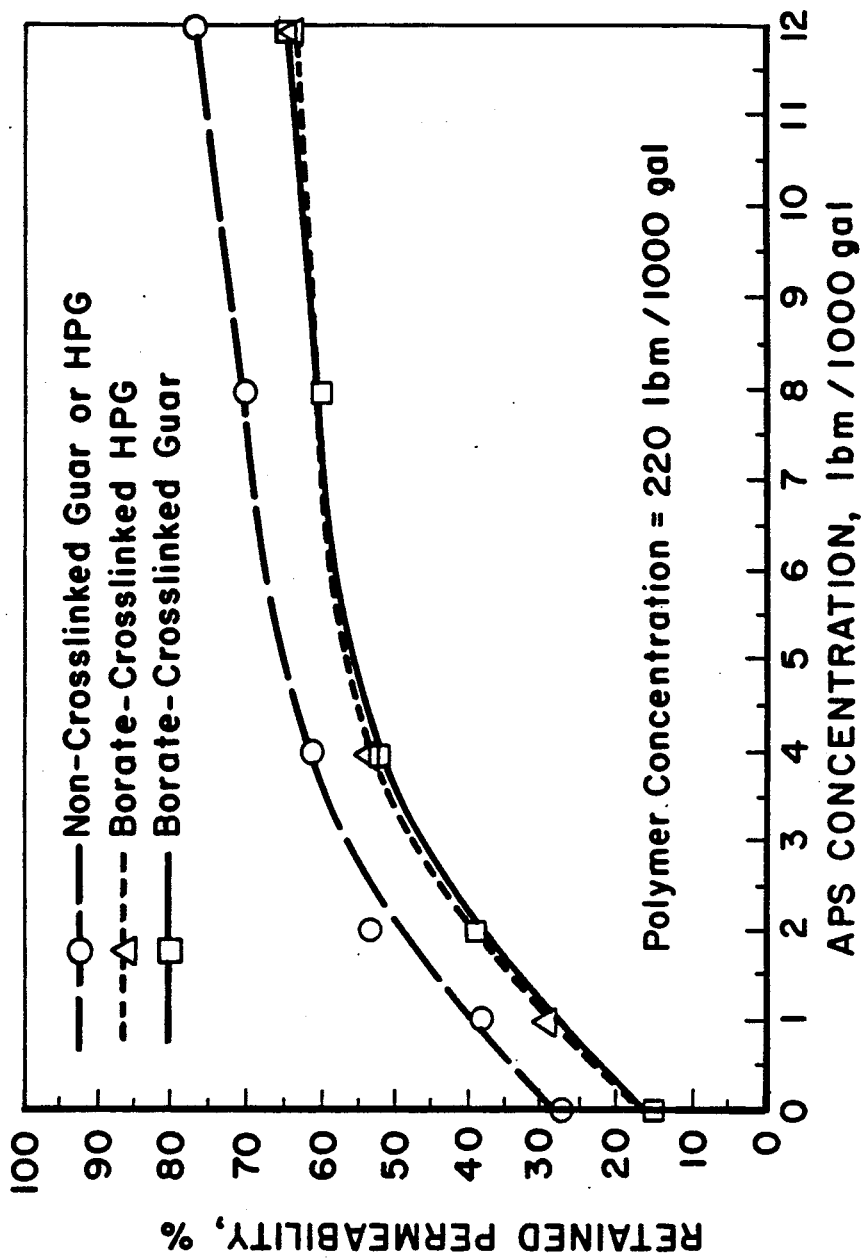
FIG. 3 shows the relationship of retained proppant pack permeability to breaker concentration in a fracturing fluid.

Tests were conducted to evaluate the retained permeability improvement achieved through the addition of varying concentrations of APS to the concentrated borate-crosslinked fluids. The effects of breaker concentration on the retained permeability of a proppant pack placed with a borate-crosslinked guar or hydroxypropyl guar-based fluid concentrated to 220 lbm/1000 gal are compared with the effects on concentrated, non-crosslinked fluids in FIG. 3.

Figure 2:
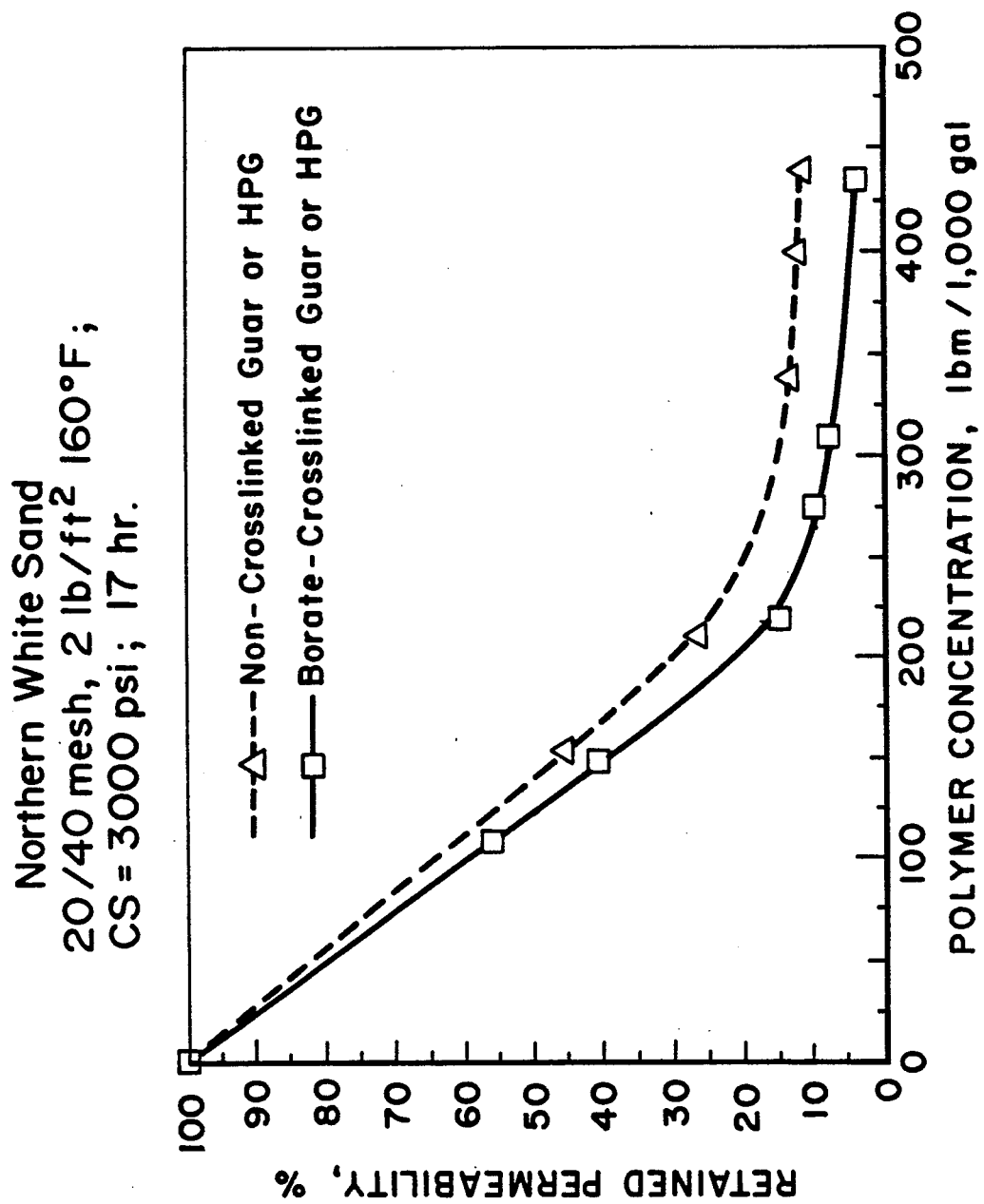
FIG. 2 shows the relationship of retained proppant pack permeability to polymer concentration in a fracturing fluid.

The test proppant pack is exposed to various polymer concentrations. The effect of various polymer concentrations on retained proppant pack permeability is depicted in FIG. 2.

Figure 4:
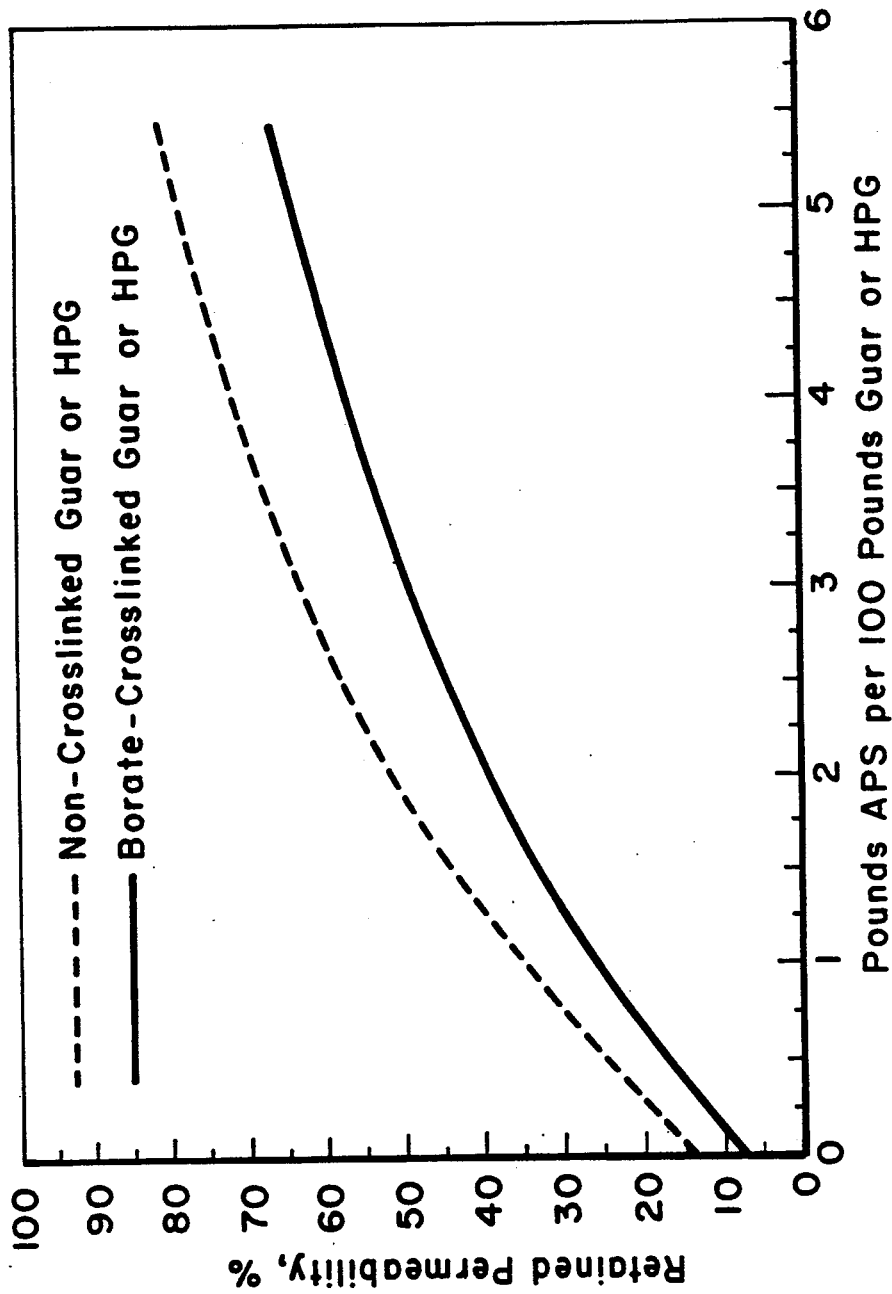
FIG. 4 shows the relationship of retained proppant pack permeability to breaker concentration for a unit volume of polymer.

The breaker and polymer concentrations are normalized by division of the breaker concentration by the post-closure polymer concentration for all tests in which polymer concentrations greater than 200 lb/1000 gal are evaluated. FIG. 4 shows the best fit curve for the normalized values plotted against their respective retained permeabilities. With the estimated post-closure polymer concentration, the breaker concentration required to achieve a desired retained proppant pack permeability can be estimated using FIG. 4.

Minimum Functional Viscosity of the Fracturing Fluid

A significant factor governing the minimum of viscosity permitted of the fracturing fluid is its ability to keep proppants suspended, until closure occurs. To simulate the conditions in a fracture, fracturing fluid samples are exposed to simulated fracture temperatures and stresses while their viscosity was measured.

Various methods are known in this art to approximate the minimum viscosity necessary to keep proppants suspended. Opinion varies as to which is superior, nevertheless, two methods will be outlined here; however, any method preferred by a skilled artisan is applicable to the present invention.

A starting point for the viscosity requirement to keep proppant suspended is Stokes Law of fluid mechanics. For low velocities, Stokes law states:

$$v_{TS} = \frac{g(\rho_p - \rho_f) \times d_p^2}{18\mu}$$

where,
- $v_{TS}$ is the terminal settling velocity
- g = gravitational acceleration
- $\rho_p$ = proppant density
- $\rho_f$ = fluid density
- $d_p$ = proppant diameter
- μ = viscosity Stokes Law, which gives proppant fall, approximates the minimum viscosity necessary to keep proppants suspended. Nolte, in his article "Application of Fracture Design Based on Pressure Analysis", SPE 13393, which is incorporated herein by reference, identifies four factors which modify Stokes Law viscosity to be closer to that actually observed. The portion of Nolte's article necessary to practice the invention is set forth as follows; nonetheless the entire paper may be consulted for additional detail. Nolte identifies the following four effects to modify Stokes Law: a crosslinking effect of the fracturing fluid, a hindered settling effect of the proppant, the apparent viscosity of the fluid in the fracture, and the change of fluid viscosity in the fracture at reservoir temperature. These effects are best illustrated in the following example.

If proppant fall were to be limited to ten feet in four hours, a direct application of Stokes Law for typical proppant would require viscosity of 1500 cp for 20/40- mesh sand. Under fracturing conditions the crosslinking effect, as identified in "Dynamic Experiments on Proppant Settling in Crosslinked Fracturing Fluids" by Harrington et al., SPE 8342, which is incorporated by reference, fall would be retarded by 50%, i.e. the viscosity must be divided by 2. Nolte in "Principles for Fracture Design Based on Pressure Analysis" in SPEPE, February, 1988, which is incorporated by reference, identified the effect of hindered settling. Assuming that the slurry dehydrates from a low proppant concentration as it enters the fracture to a higher one at the end of treatment, it would be equivalent to 3.2 in the time-average value of viscosity. If the reference viscosity is 170 sec⁻, shear rate in the fracture is 40 sec$^{-1}$, and the fluid can be characterized by the power law n=0.6, the apparent viscosity effect would be 1.8 times greater in the fracture than for the reference. If, in the fracture at reservoir temperature, the fluid viscosity reduces by a factor of 10, the average value of viscosity would be 4.3 times the final value. Combining these four factors (2×3.2 ×1.8×4.3) results in a multiple of 50. For the fluid just considered, sufficient viscosity to reduce proppant fall would be achieved if a final viscosity of 1,500 cp/50=30 cp at the end of the treatment. This estimate may be conservative because a reduction of the crosslinking effect was used, the fluid does not experience reservoir temperature for a portion of the fracture length and suspended particles are transported in the carrier portion of a channel (for viscoelastic fluids), where the shear rate is lower and the apparent viscosity is higher than the channel average. Also, crosslinked fluids can experience apparent slip flow, which further reduces the shear rate and increases the apparent viscosity of a major portion of the fluid. Consequently, the viscosity requirement for proppant transport can be grossly over estimated.

Beyond these theoretical considerations, experience has shown that for a borate-crosslinked guar, using 20/40 sand and proppant loadings varying from 2 lbs/gal to 8 lbs/gal fracturing fluid, the following viscosities are the minimum to keep proppants suspended at 150° C.:

>100 cps at 40 sec$^{-1}$

>50 cps at 170 sec$^{-1}$

In general, a major factor which influences the viscosity necessary to keep proppants suspended at different shear rates is proppant specific gravity. Accordingly, the above numeric relationship governs most proppants, because most proppants have approximately the same specific gravity. From this relationship, any fine tuning necessary will become readily apparent from working with that fracturing fluid and proppant.

Premature Release of Breaker by Encapsulant

The encapsulation of breakers is imperfect in various ways. First, the encapsulant may release some breaker as soon as it is in contact with the fracturing fluid. A second problem is that some encapsulants may never release all the breaker, which is discussed below. To gain a measure of control of the rheology of the fracturing fluid during treatment, encapsulated breaker must be tested to determine how much breaker is released upon initial contact with the fracturing fluid. Specifically, the quantity of encapsulated breaker Z which releases Y, the maximum permissible amount of breaker present to keep proppants suspended in the fracturing fluid, must be determined. This is done by introducing a known quantity of encapsulated breaker in a known concentration of the polymer to be used in the fracturing fluid at the expected bottom hole static temperature of the formation to be treated. By monitoring the viscosity change of this experimental system over time, the amount of breaker released from the encapsulant can be determine (and the quality of various encapsulated breakers can be evaluated).

Determination of Optimum Amount of Delayed and Nondelayed Breaker

After the above evaluations, the amount of breaker necessary to generate the desired permeability X and the amount of breaker which can be present to achieve a minimum acceptable viscosity Y, which is associated with a quantity of encapsulated breaker Z, are compared. If Y is less than X, then Z is the maximum amount of delayed breaker which may be used. If X is less than Y, all of X may be delivered to the fracturing fluid by delayed breaker. In this situation, economic consideration will determine how much encapsulated breaker compared to unencapsulated breaker is used to control polymer concentration in the fracture.

At fluid temperatures greater than about 140° F., the breakers can be very active, rapidly reducing the fluid viscosity and therefore, its ability to effectively transport and place the proppant. The breaker-polymer reaction rate contributing to the viscosity reduction is accelerated by increasing breaker concentration and fluid temperature. For example, at a fluid temperature of 160° F., an active APS concentration of even as little as 1 lbm/1000 gal could be tolerated for less than an hour in a crosslinked guar fracturing fluid. Although an APS concentration of 6 lbm/1000 gal would be required to achieve the desired retained permeability in the preceding example, in practice, such elevated breaker concentrations could be tolerated, from a rheological standpoint, for only a very few minutes.

Further, it should be remembered that unencapsulated breaker introduced into the fracturing fluid is lost from the fracture into the formation with the portion of non-polymeric fluids. Thus, this unencapsulated breaker is unavailable to reduce the concentrated polymer's viscosity in the proppant pack. This fact promotes the use of delayed breaker in the cost benefit analysis of the formation treatment.

As a practical matter, two opposing considerations affect the amount of delayed and nondelayed breaker used in a fracturing fluid once the theoretical optimum amount of each is determined. First is a conservative approach which tolerates lower proppant pack permeability in favor of a high viscosity fracturing fluid to ensure adequate fracturing. Thus, less delayed and nondelayed breaker is used than is theoretically ideal and some proppant pack permeability is sacrificed. On the other hand, it is known that delayed and especially encapsulated breaker is not 100% efficient in delivering breaker and thus more delayed breaker may be used than theoretical ideal calculated by the above-described process of the present invention. These modifications are also within the scope of the invention.

Where fracturing fluid rheology permits, in theory a treatment scheduled for a formation could be designed according to the present invention without the use of unencapsulated breaker altogether, especially where the amount of polymer in the fracturing fluid is lessened from the beginning of the treatment to the end. In practice however, pumping equipment necessary to allow a variation of the amount of polymer in the treatment schedule from the beginning to the end is new and this mode of treatment is accordingly not yet widely used. Accordingly, in practice, nondelayed breakers typically are used in all stages of a fracture treatment.

The optimization of delayed and nondelayed breaker of the present invention is equally applicable to both aqueous- and oil- based fracturing fluids. For either kind of fracturing fluid, a breaker effective for reducing the viscosity of the kinds of polymers used in that fluid is required. Typical polymers are guar, cellulose, derivatives of guar or cellulose, biopolymers, such as xanthan and polyvinyl alcohol. Typical breakers used to reduce the viscosity of a fracturing fluid are enzymes, oxidizing agents, such as persulfates and organic peroxides, silver, iron, or copper catalysts, and acids, such as fumaric and nitric acid. By "delayed breaker", any technique which releases breaker after an interval of time can be used in the practice of the present invention, such as delayed solubility breakers or encapsulated breakers. When using encapsulant, the kind of fracturing fluid and breaker would determine what kind of encapsulant is used. As discussed above, the kinds of encapsulants used in fracturing fluids are crushable beads, or coatings made of polymers, waxes, monomers, oligomers, and mixtures of these. Any typical proppant may be used.

In order that those skilled in this technology may better practice the invention, applicants now present an illustration of the present invention, without in any way limiting the scope of the invention. While the present process for the optimization of a mix of delayed and non-delayed breakers of the present invention is applicable to aqueous- or oil- based fraction fluids, this illustration is given for an aqueous-based system. The well data, fracture treatment scheme, economic optimization, and rheological data on a fracturing fluid are representative of actual subterranean formations which have been treated with actual fracturing fluids. Table 1 summarizes information on the type of formation and treatment. As is seen in Table 1, a sandstone formation which would be typical of Texas oil wells was to be treated. This formation had a bottom hole static temperature of 167° F. and a closure stress of 3000 psi.

TABLE 1

| RESERVOIR | |
|---|---|
| Well Type | Gas |
| Effective Perm | 0.05 mdarcy |
| Porosity | 8.0% |
| Bottom Hole Pressure | 1800 psi |
| Bottom Hole Static Temperature | 167° F. |
| Gas Gravity | 0.65 |
| Spacing | 80 acres |
| FRACTURE | |
| Rock Type | DIRTY-SANDSTONE |
| Fracture Gradient | 0.77 psi/ft |
| Young's Modulus | 7,200,000 psi |
| Poisson's Ratio | 0.19 |
| Leakoff Height | 77 ft |
| Gross Height | 276 ft |
| Closure Stress | 3000 psi |
| FRACTURING FLUID | |
| Polymer | 40 lb Borate-Crosslinked Guar |
| Initial Polymer Concentration | 40 lb/1000 gal |
| Final Polymer Concentration | 400 lb/1000 gal |
| Proppant | 20/40 Jordan Sand |
| Amount Proppant | 4 lb/gal |
| Encapsulated Breaker | Ammonium Persulfate |

TABLE 1-continued

| Percent active | 80 wt % |
|---|---|
| Premature release | 5% in 1 hr @ 160° F. |

The fracturing fluid employed for this formation treatment used borate-crosslinked guar as the polymer. The initial polymer concentration of this fracturing fluid was 40 lbs./1000 gal. 20/40 mesh Jordan sand proppant was used. The breaker used was APS and the encapsulant was polyvinylidene-chloride copolymer. When encapsulated, the APS constitutes 80 wt % of the total weight of APS plus encapsulant. The treatment schedule for this formation is detailed in Table 2. The schedule consisted of a pad stage, four subsequent stages adding incrementally more proppant (2 lb/gal, 4 lb/gal, 6 lb/gal, and 8 lb/gal fracturing fluid, respectively) and a flush after the proppant stages. The relative amounts of fracturing fluid delivered in each stage is shown in column 2 of Table 2.

By previous calculations, the concentration factor of the polymer in the fracture is determined to be 10, giving a polymer concentration in the fracture of 400 lb./1000 gal. It is determined that the fracturing fluid will reduce the proppant pack permeability to 8%. A cost benefit analysis is done by computer modeling on the net present value of the formation for 8%, 23%, 34%, and 40% retained pack permeability. Further, the total treatment cost to attain permeabilities is calculated. From this calculation it is determined that a 23% retained permeability is desired. From FIG. 4 it is seen that approximately 0.8 lbs. APS/100 lbs. polymer is necessary to attain a 23% retained permeability. As stated, there is 400 lbs. polymer per 1000 gal. fracturing fluid in the fracture and accordingly 3.2 lbs. APS/1000 gal. fracturing fluid, a quantity X, is necessary to attain a 23% permeability.

Given the amount of time each stage was in the fracture, and at the BHST, the maximum allowable dissolved APS was determined by viscosity measurements. As is seen in Table 2, this fracturing fluid only tolerates 0.25 lbs. APS/1000 gals. at a temperature of 160° C. for approximately one hour to meet the rheological demands of keeping the proppants suspended in the fracturing fluid. This value, 0.25 lb/1000 gal, also known as Y, is compared to X, of 3.2 lb/1000 gal. With Y less than X, the amount of encapsulated breaker which upon premature release releases Z may be used in the fracture treatment. This is 6.25 lbs./1000 gal. APS used in one hour at 160° C. The values for Z which are used throughout the fracture treatment is shown in Table 2 in the second column from the right. Additionally, the maximum permitted encapsulated breaker for each stage at temperature is given in Table 2.

Once the theoretical value for encapsulated and unencapsulated APS has been calculated, an actual breaker schedule with less than theoretical amounts is designed. The theoretical amounts of encapsulated and unencapsulated breaker and the amounts actually used are shown in Table 3. Once the theoretical maximum amounts of separate encapsulated or unencapsulated breaker have been determined, one way of lessening these amounts is to use 60% of the maximum encapsulated breaker and 40% of the maximum unencapsulated breaker to devise a conservative treatment schedule. The ratio of encapsulated to unencapsulated breaker actually used gradually varies from 60%:40% to 25% maximum encapsulated breaker and 75% maximum unencapsulated breaker by the end of the breaker schedule.

pounds per 1000 gal APS divided by the number of pounds of polymer per 1000 gal of fracturing fluid gives

TABLE 2

| Stage | Fluid Volume (gal) | Time in Fracture (min) | Min. Time at Temp (°F.) >120 | 160 | Max Allowable APS (lb/1000 gal) Encap APS (Z) | Unencap APS (Y) |
|---|---|---|---|---|---|---|
| Pad | 30,000 | 70 | 62 | 62 | 6.25 | 0.25 |
| 2 lb | 10,000 | 53 | 53 | 51 | 12.5 | 0.50 |
| 4 lb | 15,000 | 46 | 46 | 44 | 12.5 | 0.50 |
| 6 lb | 20,000 | 36 | 33 | 30 | 25.0 | 1.00 |
| 8 lb | 25,000 | 20 | 17 | 14 | 50.0 | 2.00 |
| Flush | 3,000 | — | — | — | — | — |

TABLE 3

| Stage | Max Encap APS (lb/1000 gal) | Max Dissolved APS (lb/1000 gal) | Breaker Schedule Encap APS (lb/1000 gal) | Dissolved APS (lb/1000 gal) |
|---|---|---|---|---|
| Pad | 6.25 | 0.25 | 3.75 | 0.10 |
| 2 lb | 12.5 | 0.50 | 7.5 | 0.20 |
| 4 lb | 12.5 | 0.50 | 7.5 | 0.20 |
| 6 lb | 25.0 | 1.0 | 12.5 | 0.50 |
| 8 lb | 50.0 | 2.0 | 12.5 | 1.50 |

Dissolved APS actually in the fracture, whether added in the unencapsulated form, or leaked from the encapsulant, is in the portion of fracturing fluid which leaks off to the formation. Table 4 summarizes the amount of non-delayed breaker from these two sources available to reduce viscosity in the fracture for each stage of the fracture treatment. Whether from unencapsulated APS or APS leaked from the encapsulant the nondelayed breaker (APS here) delivered to the fracture leaks off to the formation in an amount directly proportional to the volume reduction of the fracturing fluid in the fracture. Thus, the decrease of undelayed breaker in the fracture is directly proportional to the volume concentration increase of the polymer.

As shown in Table 4, the amount of APS, in pounds per 1000 gallons, added in each treatment stage times the volume of fracturing fluid is summed, giving the total amount of APS delivered in the entire treatment. This amount is divided by ten, the polymer concentration factor, to give how much undelayed APS is left in the fracture after leakoff or closure. The total amount of the amount of APS from dissolved breaker in the fracture; for this treatment it is 0.139 lb APS/100 lb. polymer.

TABLE 4

| | Unencapsulated Breaker | | | | |
|---|---|---|---|---|---|
| | Initial | | Post Closure | | |
| Stage | Vol (gal) | APS added (lb/1000 gal) | Vol in Fracture | APS (lb/1000 gal) | APS lb/100 lb Polymer |
| Pad | 30,000 | 0.10 | 3,000 | 0.10 | 0.025 |
| 2 lb | 10,000 | 0.20 | 1,000 | 0.20 | 0.050 |
| 4 lb | 15,000 | 0.20 | 1,500 | 0.20 | 0.050 |
| 6 lb | 20,000 | 0.50 | 2,000 | 0.50 | 0.125 |
| 8 lb | 25,000 | 1.50 | 2,500 | 1.50 | 0.375 |
| Total | 100,000 | 55.5 | 10,000 | 5.55 | 0.1388 |

The same analysis for APS leaked from encapsulated breaker is shown in Table 5. The amount of encapsulated breaker initially added is multiplied times 0.05, because previous testing determined that this encapsulated breaker system at 160° F. for one hour exhibited 5 wt. % leakage. In this way the amount of APS leaked was calculated for each stage. Those values calculated were then divided by 4 in this case to normalize the amount, in pounds, of APS leaked per 100 lbs. polymer (in this case, the polymer concentrated to the amount of 400 lbs./1000 gal). Thus, the amount of nondelayed APS in the fracture from premature release from the encapsulant is 0.11 lbs./100 lbs. polymer. The total amount of undelayed breaker is 0.14 lbs./100 lbs. polymer from unencapsulated breaker added initially plus 0.11 lbs./100 lbs. polymer from premature encapsulant release.

TABLE 5

| | Initial | | Post Closure | | |
|---|---|---|---|---|---|
| Stage | Vol (gal) | Encap APS (lb/1000 gal) | APS leaked (lb/1000 gal) | Vol (gal) | APS leaked (lb/1000 gal) | APS leakage lb/100 lb polymer |
| Pad | 30,000 | 3.75 | 0.188 | 3,000 | 0.188 | 0.0469 |
| 2 lb | 10,000 | 7.50 | 0.375 | 1,000 | 0.375 | 0.0938 |
| 4 lb | 15,000 | 7.50 | 0.375 | 1,500 | 0.375 | 0.0938 |
| 6 lb | 20,000 | 12.5 | 0.625 | 2,000 | 0.625 | 0.156 |
| 8 lb | 25,000 | 12.5 | 0.625 | 2,500 | 0.625 | 0.156 |

TABLE 5-continued

| | Initial | | Post Closure | | | |
|---|---|---|---|---|---|---|
| Stage | Vol (gal) | Encap APS (lb/1000 gal) | APS leaked (lb/1000 gal) | Vol (gal) | APS leaked (lb/1000 gal) | APS leakage lb/100 lb polymer |
| Tot | 100,000 | 855.8 | 42.9 | 10,000 | 4.29 | 0.110 |

By contrast, while unencapsulated breaker leaves the fracture, encapsulated breaker stays in the fracture with the proppant and polymer. Accordingly, the encapsulated breaker concentrates by a factor 10 rather than diluting by a factor of 10 like the unencapsulated breaker does. As shown in Table 6, the amount of breaker remaining within the encapsulant is 0.95 times the original amount added, to take into account that which had leaked. The amount of encapsulated APS added was calculated for each stage of the fracture treatment. This amount then was multiplied by 10 to take into account the concentration in the fracture of post closure. From this, the total number of pounds encapsulated APS delivered throughout a treatment is summed. To calculate the amount of active APS delivered by the encapsulant, this amount is reduced by the wt. % of APS to the total wt. % of APS plus encapsulant, 0.8 in this case, resulting in 655.5 lbs. of active APS delivered to the proppant pack by the entire treatment. When normalized to a calculation per 100 lbs. of polymer prior to concentration, this corresponds to 16.93 lbs. APS delivered per 100 lbs. polymer for this fracturing fluid.

prior art, the advantages of the disclosed process are striking. The amount of breaker in the fracture from unencapsulated breaker is equivalent to a prior art process. Table 6 shows that unencapsulated breaker APS alone delivers 0.22 lbs./100 lbs. polymer to the fracture. By contrast, the combination of encapsulated plus unencapsulated breaker of the present invention delivers 16.39 lbs. APS/100 lbs. polymer of active APS for release from a perfectly efficient breaker system plus 0.11 lbs. APS/100 lbs. polymer of APS available to the fracture from premature leakage, totally 16.66 lbs./100 lbs. polymer. Accordingly the amount of active APS available to the fracture according to the present invention compared to the prior art is over 80 times more.

TABLE 7

SUMMARY

| | Initial | | | | IN FRACTURE | |
|---|---|---|---|---|---|---|
| | | | | | | Dissolved |
| Stage | Vol (gal) | Max Unecap APS (lb/1000 gal) | Encap APS (lb/1000 gal) | Unecap APS (lb/1000 gal) | Encap APS Avail* | APS all sources (lb/1000) |
| Pad | 30,000 | 0.25 | 3.75 | 0.1 | 28.5 | 0.29 |
| 2 lb | 10,000 | 0.50 | 7.5 | 0.2 | 57.0 | 0.58 |
| 4 lb | 15,000 | 0.50 | 7.5 | 0.2 | 57.0 | 0.58 |
| 6 lb | 20,000 | 1.0 | 12.5 | 0.5 | 95.2 | 1.13 |
| 8 lb | 25,000 | 2.0 | 12.5 | 1.5 | 95.2 | 2.12 |

| APS Available in Post-Closure Proppant Pack | | | |
|---|---|---|---|
| Type | lbs | lb/1000 gal | lb/100 lb polymer |
| Max Unencap APS | 9 | 0.9 | 0.22 |
| Encap Active APS Avail | 656 | 65.6 | 16.4 |
| Dissolved APS, all sources | 9.8 | 0.98 | 0.25 |

*(active lb/1000 gal)

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents

TABLE 6

| | Initial | | Post Closure | | | | |
|---|---|---|---|---|---|---|---|
| Stage | Vol (gal) | Encap APS Added (lb/1000 gal) | Vol (gal) | APS Remaining Encap (lb/1000 gal) | APS (lb/1000 gal) | APS (lb) | APS Active (lb) |
| Pad | 30,000 | 3.75 | 3,000 | 3.56 | 35.6 | 107 | 85.5 |
| 2 lb | 10,000 | 7.50 | 1,000 | 7.13 | 71.3 | 71.3 | 57.0 |
| 4 lb | 15,000 | 7.50 | 1,500 | 7.13 | 71.3 | 107 | 85.5 |
| 6 lb | 20,000 | 12.5 | 2,000 | 11.9 | 119 | 238 | 190 |
| 8 lb | 25,000 | 12.5 | 2,500 | 11.9 | 119 | 298 | 238 |
| Total | 100,000 | — | 10,000 | 8.19 | 81.9 | 821 | 656 |

When comparing the amount of breaker available to the fracture from the present invention compared to the

What is claimed is:

1. A method of reducing viscosity of a fracturing fluid containing proppant, a polymer, a delayed breaker and a nondelayed breaker comprising the steps of:
   i) introducing said fracturing fluid into a subterranean formation to form at least one fracture;
   ii) depositing said proppant and said polymer in said fracture;
   iii) determining an after closure polymer viscosity of said deposited polymer in said fracture;
   iv) selecting a proppant pack permeability in said fracture;
   v) calculating an amount of breaker necessary to reduce said after closure viscosity of said deposited polymer of (iii) to attain the selected permeability of (iv);
   vi) determining a minimum viscosity of said fracturing fluid which maintains said proppant in suspension in the fluid during pumping in the fracture; and
   vii) introducing an effective amount of delayed breaker and nondelayed breaker into said fracturing fluid to attain said selected proppant pack permeability of (iv) while maintaining said minimum viscosity to maintain said proppant in suspension in the fluid during pumping in the fracture.

2. A method of reducing the viscosity of a fracturing fluid as defined in claim 1, wherein the fracturing fluid is an aqueous-based fluid.

3. A method of reducing the viscosity of a fracturing fluid as defined in claim 1, wherein the fracturing fluid is a hydrocarbon-based fluid.

4. A method of reducing the viscosity of a fracturing fluid as defined in claim 1, wherein the polymer is a member of the group consisting of guar, derivatives of guar, cellulose, derivatives of cellulose, xanthan, and polyvinyl alcohol.

5. A method of reducing the viscosity of a fracturing fluid as defined in claim 1, wherein the delayed breaker and the nondelayed breaker are the same substance.

6. A method of reducing the viscosity of a fracturing fluid as defined in claim 1, wherein the delayed breaker comprises a breaker surrounded by an encapsulant.

7. A method of reducing the viscosity of a fracturing fluid as defined in claim 6, wherein the encapsulant is a member of the group consisting of crushable beads, a polymer, wax, monomers, oligomers, and mixtures thereof.

8. A method of reducing the viscosity of a fracturing fluid as defined in claim 6, wherein the encapsulant is a polyvinylidene-chloride copolymer.

9. A method of reducing the viscosity of a fracturing fluid as defined in claim 1, wherein the breaker is a member of the group consisting of enzymes, oxidizing agents, silver ions, iron ions, copper ions, and acid.

10. A method of reducing the viscosity of a fracturing fluid as defined in claim 9, wherein the oxidizing agent is an organic peroxide and the acid is a member of the group consisting of fumaric acid and nitric acid.

11. A method of reducing the viscosity of a fracturing fluid as defined in claim 1, wherein the breaker is ammonium persulfate.

* * * * *